Aug. 4, 1959  S. UNTERMYER ET AL  2,898,281
NEUTRONIC REACTOR CONTROL
Filed Sept. 29, 1954  6 Sheets-Sheet 1

INVENTORS
SAMUEL UNTERMYER
ERNEST HUTTER
BY
Roland A. Anderson
ATTORNEY

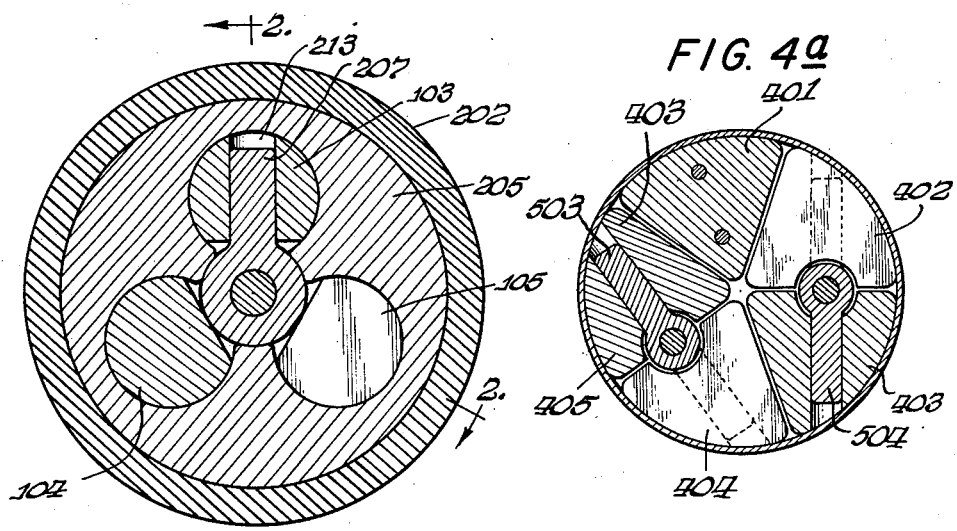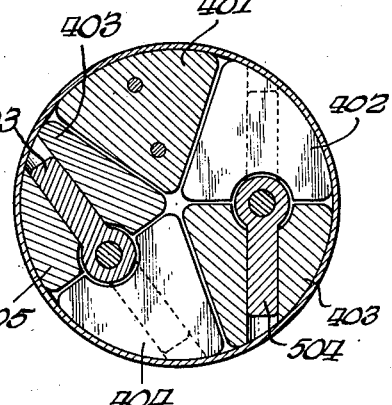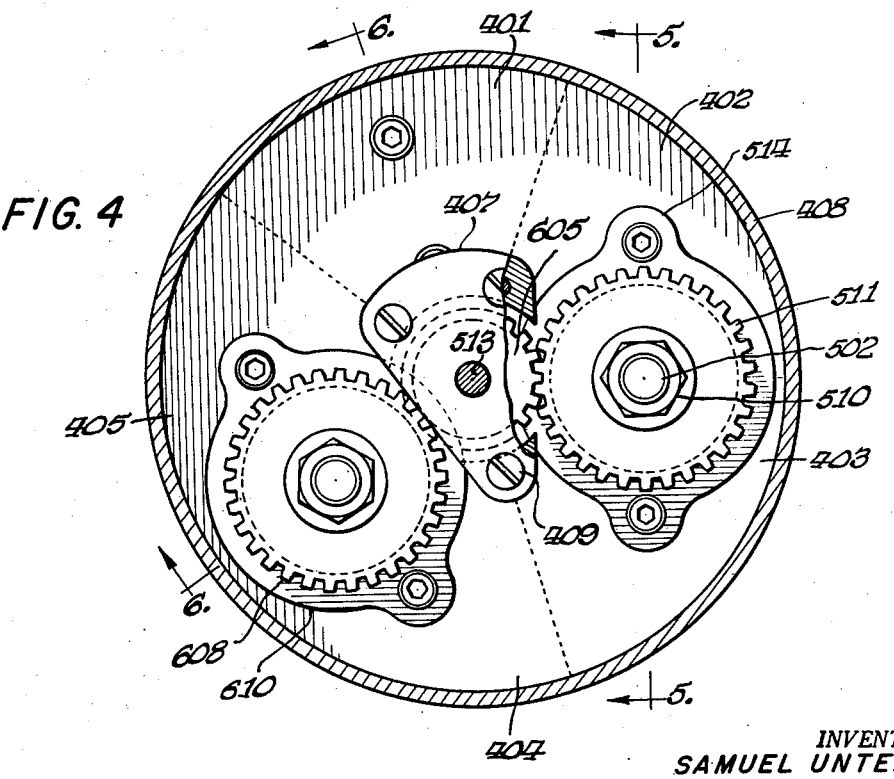

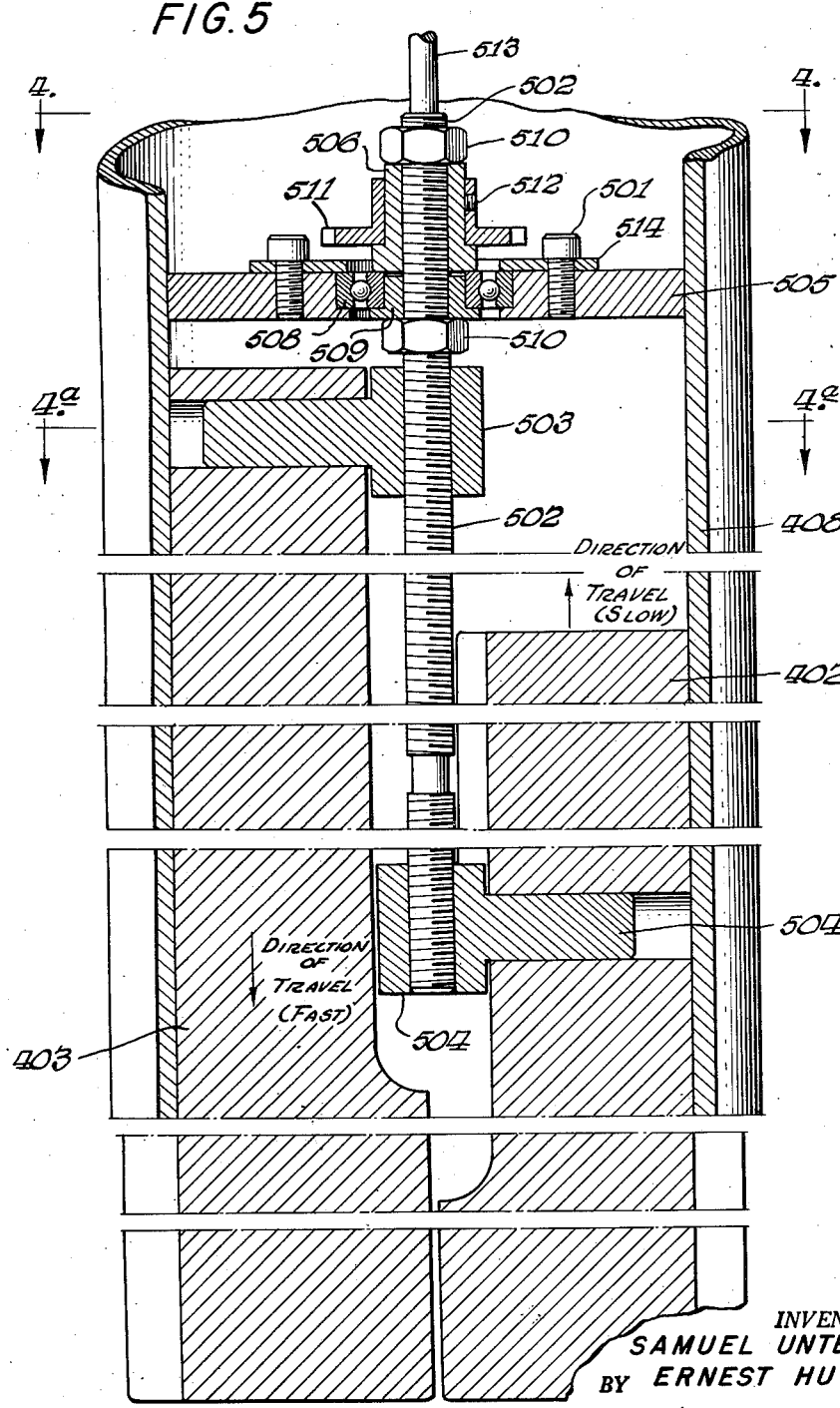

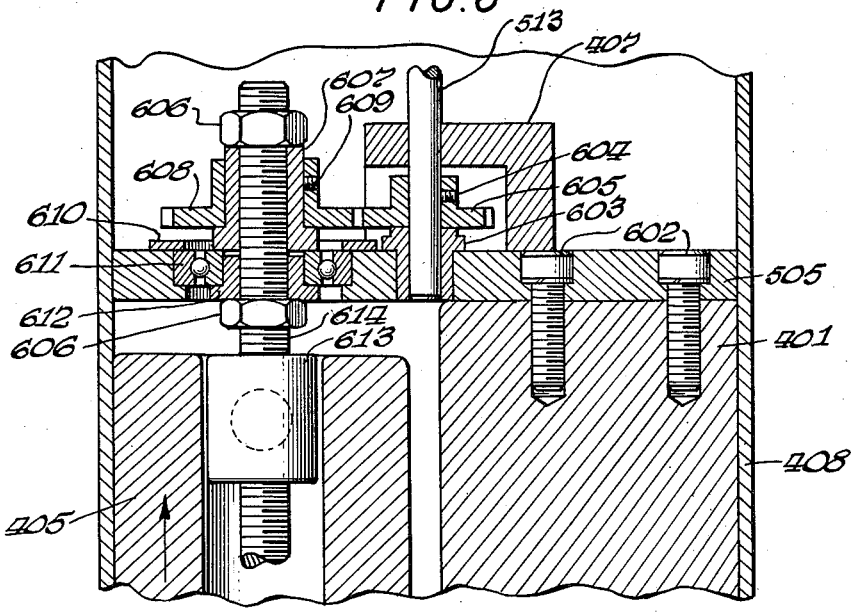
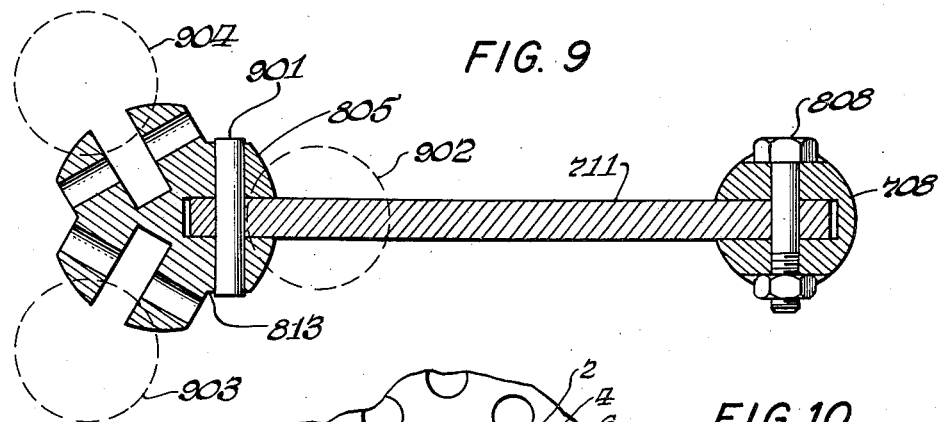
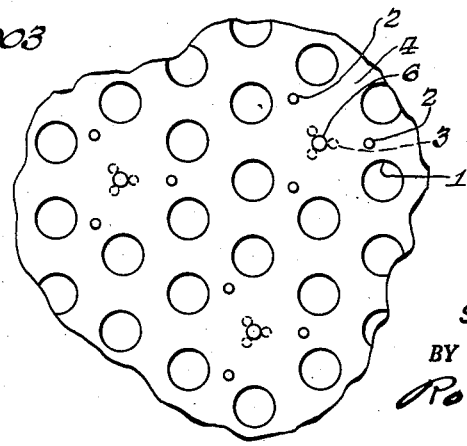

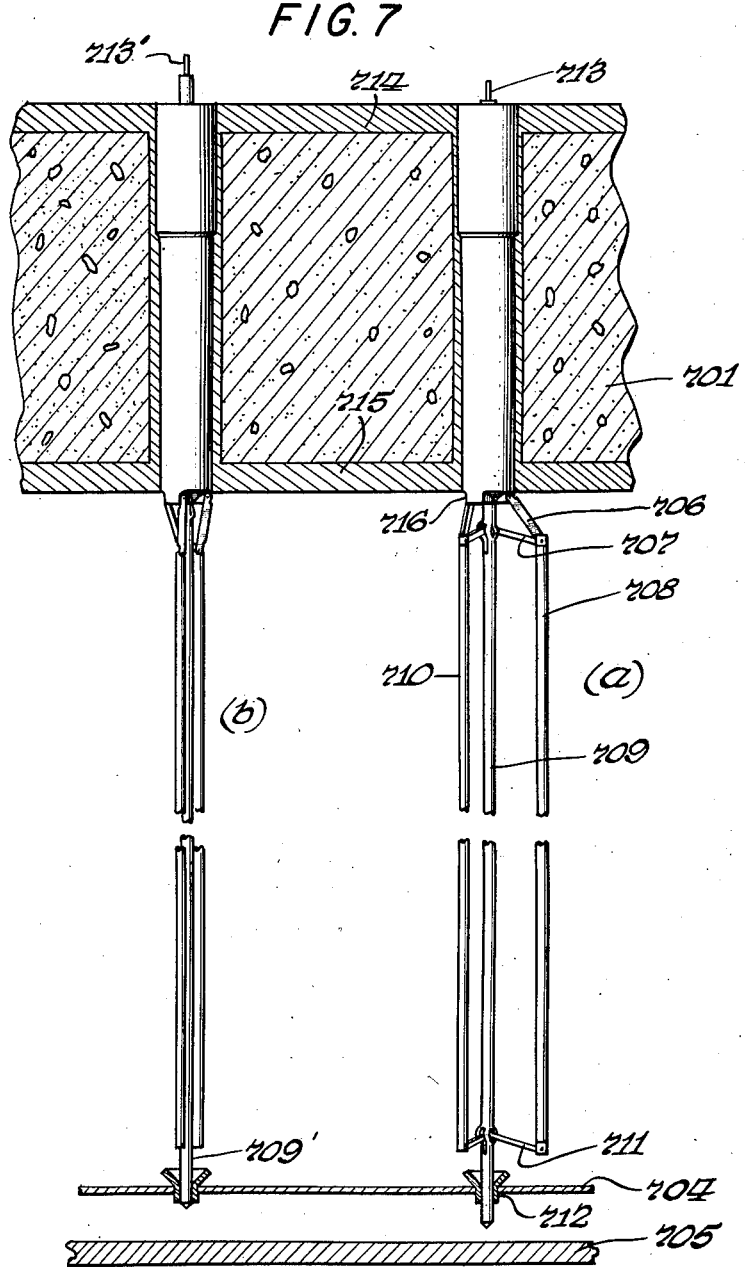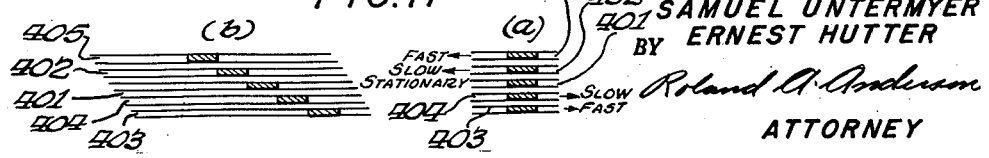

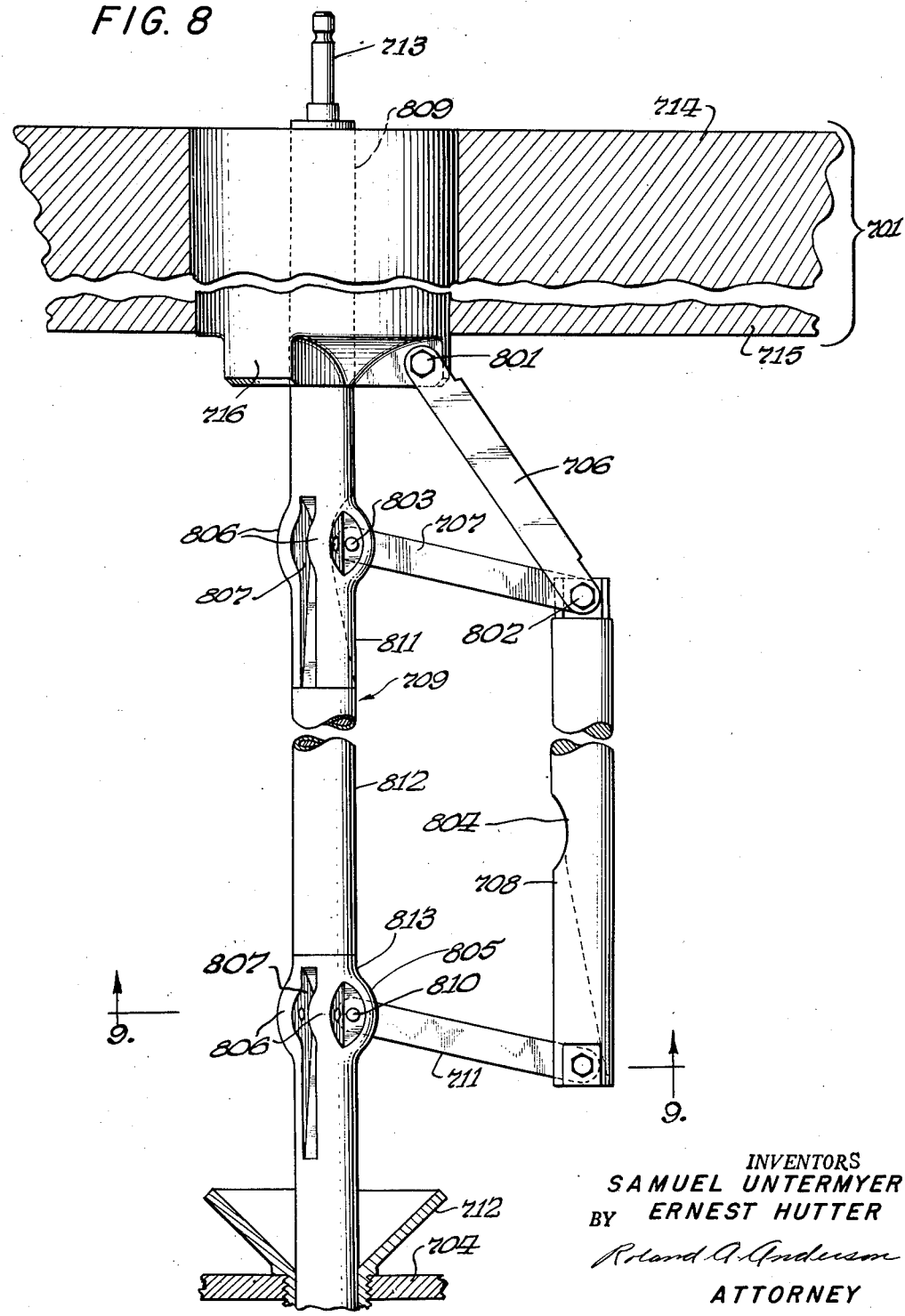

United States Patent Office 2,898,281
Patented Aug. 4, 1959

2,898,281

NEUTRONIC REACTOR CONTROL

Samuel Untermyer, Scotia, N.Y., and Ernest Hutter, Chicago, Ill., assignors to the United States of America as represented by the United States Atomic Energy Commission Application September 29, 1954, Serial No. 459,219

7 Claims. (Cl. 204—193.2)

This invention relates to control devices for neutronic reactors and more particularly to control devices which effect uniform control over reactivity in a reactor.

In thermal neutronic reactors, a thermal neutron fissionable isotope, such as $U^{233}$, $U^{235}$ or $Pu^{239}$, or mixtures thereof, is subjected to fission by absorption of neutrons, and a self-sustaining chain reaction is established by the neutrons evolved by the fission. In general, such reactors comprise bodies of compositions containing a fissionable material, such as, for example, natural uranium disposed in a neutron slowing material which slows down the neutrons to thermal energy. Such a "slowing down" material is termed a neutron moderator. Certain materials, such as carbon, beryllium, and $D_2O$, are typical moderators suitable for such use. The heat which is evolved by the fission is removed by passage of a coolant through the reactor or in a heat exchange relationship therewith. Specific details of the theory and essential characteristics of such reactors are set forth in U.S. Patent 2,708,656, issued to Enrico Fermi and Leo Szilard on May 17, 1955.

In any of such reactors, the rate of reaction is controlled by the introduction into the active portion (chain reactive core) of the reactor, or into an area closely adjacent to the active portion, a control element having a high neutron absorbing characteristic, commonly referred to as "danger coefficient." Materials, such as boron or cadmium, have high neutron absorbing characteristics. The control elements are commonly known in the neutronic reactor art as "control rods."

The neutron absorption characteristics of high and low absorbers may be expressed conveniently in terms of certain constants known as "danger coefficients." A list of the danger coefficients of various elements appears in the above-mentioned Fermi-Szilard application and reference is made thereto.

The usual method of control of reactivity in a neutronic reactor, as is known to those skilled in the art, is by means of insertion and withdrawal of control elements into and from the reactor. This present method of control is not too satisfactory because, from the operational standpoint, it results in an uneven flux distribution in the active portion of the reactor, and from the physical standpoint, it requires that a particular spatial clearance be kept around the neutronic reactor active portion so that the control elements, during operation, can be withdrawn partially from the confines of the active portion.

An object of this invention is to provide a neutronic control device which is entirely housed within the reactor structure.

Another object of the present invention is to provide a neutronic control element which will improve the neutron flux distribution within the reactor.

Another object of the present invention is to provide a method of moving control elements relative to each other in an active zone of the reactor so that the control over reactivity extends through out the entire zone.

Another object of the invention is to provide a control apparatus having several control elements which are moved at different rates of speed within the reactor by a single motive means common to all of the control elements.

The above objects and other objects, features and advantages of the invention will be apparent from the following detailed description of several preferred embodiments when taken in conjunction with the accompanying drawing, in which:

Figure 3 is a transverse cross-sectional view of the control device taken along the lines 3—3 of Figure 2;

Figure 4 is an end view of a second embodiment of this invention showing a control device employing a group of five control elements, the end view being taken along the lines 4—4 of Figure 5;

Figure 4A is a cross-sectional view, on a reduced scale, of the control device taken along the level 4A—4A of Figure 5;

Figure 5 is a longitudinal cross-sectional view of the second embodiment of the invention taken along the lines 5—5 of Figure 4;

Figure 6 is a longitudinal cross-sectional view of the second embodiment of the invention taken along the lines 6—6 of Figure 4;

Figure 7 is a schematic view of a third embodiment of the invention showing a control device employing radially expanding control rods assembled in a group;

Figure 8 is a detailed side view of a portion of the expanding control group;

Figure 9 is a partial cross-sectional view of the control group taken along the lines 9—9 of Figure 8;

Figure 10 is a schematic view of a series of control groups occupying positions within a reactor lattice; and Figure 11 is a schematic view of a fragmentary portion of a group of five control members, as described in the second embodiment, shown in one plane.

The purpose of the control device is to vary the reactivity and hence the power output of the neutronic reactor automatically, or at the will of an operator, by absorbing an appropriate and adjustable fraction of the neutrons that are formed within the active zone of the reactor. The control of reactivity is obtained by translational and transverse displacement of one member of a group of members, each member comprising a multiude of alternate sections of neutron absorbing and neutron non-absorbing sections, commonly called zones, the neutron controlling section being called a neutron "absorber" zone and the non-absorbing neutron section being termed "neutral" zone.

Figure 1:
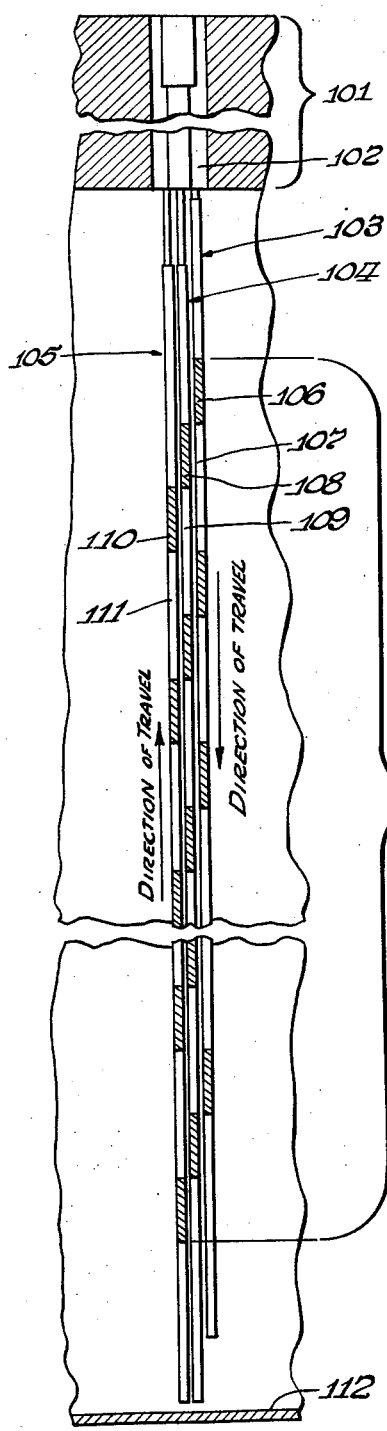
Figure 1 is a schematic view of a first embodiment of this invention showing a control device employing three control rods, the control rods being shown in one plane to facilitate the understanding thereof.

Referring to Figure 1, the first embodiment of this invention comprises a group of three control rods 103, 104 and 105 integrally associated with each other. Each of the control rods, such as 103, contains a succession of absorber zones, such as 106, separated by neutral zones, such as 107. These control rods are suspended by appropriate means within a neutronic reactor which is only partially shown in the figure. Specific details of construction of several typical neutronic reactors are described in the aforementioned Fermi-Szilard patent. The top of the neutronic reactor is shown by the reference numeral 101, and is essentially a shield to prevent the emanation of radiation from the active region (chain reactive core) 113 of the reactor (thermal pile). A channel 102 extending through the shield 101 contains the necessary means for controlling the movement of the movable control rods 103 and 105 with respect to each other and to the stationary rod 104. The control rods 103, 104, and 105 comprise absorber zones 106, 108, and 110 and neutral zones operating within the neutron active region 113 of the reactor. These control rods extend approximately to the bottom 112 of the reactor.

As was indicated before, the control rods in this figure are shown in one plane to facilitate the understanding of the operation of the control rods within the reactor proper. As shown, the control rods are in their most effective position, that is, the maximum neutron absorption occurs in this position when the neutron absorbing zones, such as 106, 108, and 110 are in a longitudinally extended position with only a slight overlap therebetween. The control group will be in the least effective position when the absorber zones 106, 108 and 110 are superimposed upon each other and the neutral zones 107, 109 and 111 are also superimposed upon each other, thereby presenting intermittent neutral zones which allow unobstructed passage to neutrons in the active region of the reactor.

The control rods are made of any suitable material having the necessary structural qualities. The absorber zones comprise a material which has neutron absorbing characteristics, such as lithium, boron or thorium, or any combination thereof. During the control operation, as mentioned above, one of the rods, namely rod 104, remains stationary while the other rods 103 and 105 move in opposite directions relative to each other. The direction of travel of rods 103 and 105 is shown by appropriate arrows which indicate the movement whenever it is desired that the group of control rods assume its least effective control position.

Figure 2:
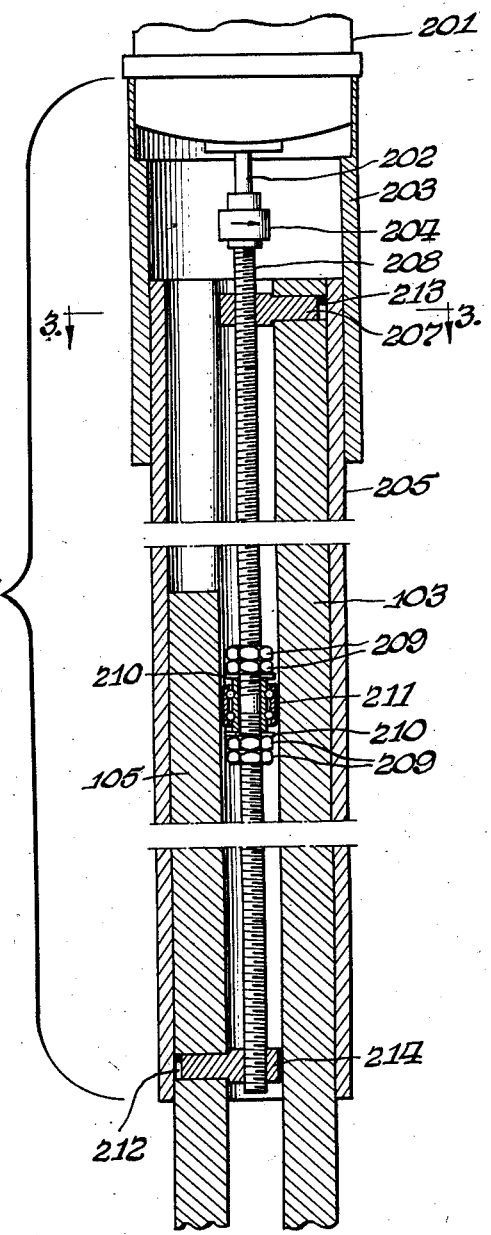
Figure 2 is a longitudinal cross-sectional view of the control device, the cross section being taken along the lines 2—2 of Figure 3.

The cooperation of the various elements which comprise the control group is shown in Figure 2. The portion of the control group shown in Figure 2 is essentially located within the shield 101 of the reactor. It is to be noted that this portion of the control group does not contain the absorber and neutral zones. A tubular housing 203 serves as a means of support for an electric motor 201 and also for a matrix 205 which contains therein the group of control rods together with a means used for propulsion thereof. The movable control rods 103 and 105 are made to move with respect to the stationary control rod 104 and to each other by means of a threaded rod 208 having a right-hand thread at one end and a left-hand thread at the other end and which is coupled by means of a coupling 204 to a shaft 202 of the motor 201. Near the coupled end of the rod 208 and threaded thereon, is a connector pin 207 which engages the control rod 103 by means of an opening 213 located therein. Similarly, near the other end of the rod 208, there is located another connector pin 214 which engages the control rod 105 by means of an opening 212 located therein. In order to lend structural support to the rod 208 during operation, a roller bearing is mounted approximately in the center of said rod, said roller bearing being indicated by the reference numeral 211. The roller bearing 211 is kept in the mid-position of the rod 208 by means of abutting washers 210 which in turn are positively secured against the bearing 211 by means of nuts 209. The housing 202 and the matrix 205 housing the control rods are made of any suitable material having good structural qualities. Assuming for a moment that the rotation of the motor 201 is in such a direction as to rotate the coupling 204 in the direction indicated by the arrow on said coupling, the effect of this rotation will be to apply screwing force to the connector pins 207 and 214 in such a direction that the pins are made to approach each other until they reach the extreme limit of their travel towards each other at the position occupied by the supporting bearing 211. After the connector pins 207 and 214 reach this extreme position, appropriate means, such as microswitches (not shown), are operated to shut off the motor 201. This extreme position is the position of least effective neutron absorption, the control rods being essentially lined up with each other so that the adjacent absorber zones are occupying the same longitudinal spacing as was explained hereinbefore.

Referring to Figure 3, a transverse section of the control device is shown taken along the lines 3—3 of Figure 2. The control elements, such as 103, are essentially cylindrical in shape and move within similarly shaped cavities found in the matrix 205. The relationship of the various parts shown in Figure 3 is self-explanatory when taken in conjunction with Figure 2.

Referring to Figure 4, an end view of an integral control group, which comprises the second embodiment, is shown as having a plurality of movable sections 402, 403, 404, and 405. A control member 401 remains stationary at all times. The movable members and the stationary member comprising the control group are housed within a casing 408. A cover plate 407 is secured by means of screws 409 to the top of the control device and serves to protect a driving gear 605 which engages a pair of driven gears 511 and 608. The operation of the driving mechanism will be more fully described hereinafter. A better view of the members comprising the control group may be had from Figure 4A which is a reduced cross-sectional view of the group taken along the lines 4A—4A of Figure 5.

Figure 5 shows the construction details of the control group taken along the section view 5—5 of Figure 4. A threaded rod 502 extends through the casing 408, said rod being adapted to drive two connector pins 503 and 504 in opposite directions, each of said connector pins situated at one end of the extremities of the rod 502. Similarly, another threaded rod is utilized to drive the other two movable control members 404 and 405 (Figure 4). The rod 502 is supported on a mounting plate 505 by means of a nut 510, a bearing mounting shoulder 509, a ball bearing 508, a bushing 506, and another nut 510. The ball bearing 508 is mounted within a recess in the mounting plate 505 and kept rigidly within said recess by means of a locking ring 514 which is also mounted on the mounting plate 505 by means of screws 501. It is to be noticed that the threaded portion of the rod 502 which engages the connector pin 504 is of finer nature than the threaded portion of the rod 502 which engages the connector pin 503. Any rotation of the rod 502 will cause the connector pin 503 to move at a faster rate than the connector pin 504 on account of this difference in threads. As indicated by the arrows, when a certain rotational force is applied to the rod 502, the control member 402 will move in a direction toward the mounting plate 505 at a slower rate than the control member 403 will move away from the mounting plate 505 because of the difference in the threaded portions of the rod 502.

The mounting plate 505, as shown in Figure 6, serves as a means for attaching the stationary control member 401 thereto by means of screws 602. A motor shaft 513 connects the motor (not shown) to a driver gear 605 which is mounted on the shaft 513 and held securely thereon by means of a set screw 604. The motor shaft 513 terminates in a bearing 603 which is press-fitted securely in the mounting plate 505. The description of construction and interrelationship of the various driving components associated with the threaded rod 502 applies equally well to the threaded rod 614 and its associated components. The rod 614 is mounted on the plate 505 by means of a nut 606, a bearing mounting shoulder 612, a ball bearing 611, a bushing 607, and another nut 606. This arrangement allows the rod 614 to be rotated but prevents said rod from having any translational movement. The ball bearing 611 is mounted within a recess located in the mounting plate 505 and secured therein by means of a locking ring 610. A gear 608 is mounted on the bushing 607 and secured thereto by means of a set screw 609. Assuming for a moment that a rotational movement is imparted by the motor shaft 513 to the driver gear 605, this motion will be transmitted from said driver gear 605 to the driven gear 608 which is securely mounted on the rod 614 causing thereby the rod 614 to rotate and to impart translational movement to the control member 405 via a connector pin 613. The movement of the control member 405 will be in an opposite direction to that shown for the member 403 and is shown by an arrowhead; the movement of this control member 405 being also of a fast nature. The views of the control group shown in the Figures 4, 4A, 5 and 6 disclose various positions occupied by the individual control members in both the most effective and least effective neutron absorbing control positions. It is to be understood therefore that the arrows indicating the direction of movement of the movable members show only relative movement between the members occurring during the operation of attaining the most effective neutron absorbing position as later shown in Figure 11.

The neutron controlling portions (absorbers) of the control members have not been shown because of the fragmentary nature of the Figures 5 and 6. The description of construction and operation of the absorber and neutral zones made in reference to Figure 1 is equally applicable to the second embodiment of the invention shown in Figures 4, 5 and 6.

In the various embodiments described hereinbefore, only one control group has been treated to simplify the discussion. However, any number of such control groups, each of the groups having a varying number of control members, can be used within a reactor for the purpose of controlling neutronic reaction.

As was previously indicated in the forepart of this discussion, the control means described herein have been constructed to operate within the reactor proper. Referring for example back to Figure 2, the entire movement of the control elements in this particular embodiment takes place within the region occupied by the reactor and the control rods do not extend beyond the reactor shield 101. This type of arrangement overcomes the objection to the former methods of total or partial withdrawals of the control rods out of the reactor proper.

The embodiments described hereinbefore essentially indicate a method of controlling the reactivity in a neutronic reactor in such a manner as to obtain a fairly uniform distribution of neutron flux in the reactor active region. If reference be made to Figure 1 and the control rods are rearranged so that the control group is in its least effective position, the absorber zones such as 106, 108 and 110 will be lined up together, that is, they will occupy the same longitudinal spacing along the reactor length. This leaves the neutral zones 107, 109 and 111 also occupying a similar longitudinal spacing, thus allowing the neutrons to pass therethrough unhindered. This type of arrangement enables the control group to remain within the active region of the reactor at all times, which arrangement is a distinct improvement over the older method of withdrawing a control rod from the active zone resulting thereby in a high neutron flux in a vacated region and a low neutron flux in the region still occupied by the partially withdrawn rod. Figure 11, position "a," illustrates schematically a portion of a control group which has been described in reference to the second embodiment of this invention. The individual members of the control group are shown in one plane to indicate the arrangement of the absorber and neutral zones. The position of the absorber zones indicates that neutrons can pass through the control group on either side of the absorber zones without being hindered and that the neutron absorber zones, such as 405 and 403 shield or cast a shadow on the other absorber zones such as 401, 402 and 404 so that the inner absorber zones exert only a small portion of control on neutrons passing through the space occupied by these absorber zones. The members 405 and 403 move at a greater rate of speed than the members 402 and 404 whenever the control device is operated to exert control over reactivity in a reactor. The most effective position of the control members within the group to control reactivity in a reactor is shown in Figure 11, position "b," wherein all of the absorber zones are staggered at intervals with a slight overlap so that a larger spatial distribution is obtained with the absorber zones to impede the passage of neutrons passing through said control group.

Another embodiment of a neutronic control is shown in Figure 7. Figure 7, position "a," shows a group of control rods 708 and 710. Another rod is hidden from the view behind the rod 710. Each of the rods, such as the rod 708, is attached by suitable means, such as 706, 707 and 711, to a foundation rod 709, which is centrally located among the control rods, and an anchor 716. The anchor 716 is securely mounted within a shield 701 of the reactor. The foundation rod 709 is movably mounted in the anchor 716 and extends beyond the shield 701 of the reactor and terminates in an operating arm 713. The other end of the foundation rod 709 extends through a bushing 712 which is secured in a mounting plate 704 which in turn is attached by suitable means (not shown) to a bottom 705 of the reactor. The details of attachment of the control rods to both the anchor 716 and the foundation rod 709 will be discussed hereinbelow in reference to Figure 8. Figure 7, position "b," shows the control group, as described in reference to Figure 7, position "a" occupying a position in which the group is least effective to exert control over neutronic reaction in the reactor. The collapsed position of the control rods in this group was achieved by a force applied to the foundation rod 709' at its operating arm 713'. The position of the operating arm 713' indicates, as compared to Figure 7, position "a" that a partial withdrawal of the rod 709 was made from the reactor in order to collapse the control rods around the centrally located foundation rod 709. Whenever the control rods are occupying the position indicated in Figure 7, position "a," a maximum amount of control is effected over neutronic reaction in the reactor. The shield 701 of the reactor comprises two walls 714 and 715, the space between said walls being filled with suitable material for the absorption of radiation.

Referring to Figure 8, structural details of the control group initially described in reference to Figure 7 are shown on an enlarged scale. The anchor 716 is a cylindrical bar mounted within the shield 701 of the reactor. A bore 809 extends axially through the anchor 716 so that the foundation rod 709 may be inserted therethrough to have its associated operating arm 713 extend beyond the upper wall section 714 of the shield 701. The foundation rod 709 may be made from one piece of material which may or may not possess neutron absorbing characteristics. In this particular embodiment, the foundation rod 709 comprises a pair of pivot bases 811 and 813 having a neutron absorbing rod 812 mounted therebetween. The control rod 708 is secured to the pivot base 811 and 813 by means of a pair of extension members 707 and 711 which are secured at one of their ends to the control rod 708 by means of bolt and nut combinations 802 and 808, respectively. The other ends of the extension members 707 and 711 are secured to the pivot bases 811 and 813 by means of pins 803 and 810, respectively. The pivot bases 811 and 813 are made of suitable structural material capable of supporting the control rods attached thereto. As seen in Figure 8, each of the pivot bases has a series of slots cut therein for the admission of the extension members, such as 707. The pivot bases are ordinarily cylindrical in form but they do possess a heavy section at the point of pivot support where the extension members are engaged therewith. These heavy sections are shown as possessing the bulbous protuberances 806 with a slot cut therethrough, such as slot 807, adapted for the admission of the extension members. The other control rods which are included in this group as similarly attached to the same foundation rod 709. The anchor member 706 is operatively attached to the junction of the linkage existing between the extension member 707 and the control rod 708, namely, the junction held together by the nut and bolt combination 802. The other end of the anchor member 706 is pivotably attached to the anchor 716 by means of a nut and bolt combination 801. The anchor member 706 is fabricated so as to possess a hollow suitable for the admission of the extension member 707 whenever the control group is in a collapsed position. The control rods, such as 708, have a notch, such as 804, cut out on the inner side of the control rods so that when the group is in a collapsed position, the control rod 708 may be brought into a closer relationship with the foundation rod 709 by having the notch 804 engage the protuberance 805. The application of a force to the operating arm 713 in a direction to withdraw the foundation rod 709 from the reactor will cause a collapse of the control group so that each of the control rods, such as 708, will align itself parallel to the other rods and assume a close spatial position to the foundation rod 709.

The method of attachment of the extension member 711 to the control rod 708 is shown in an end cross-section view of Figure 9 wherein the nut and bolt combination 808 attaches operatively the two members together. The other extremity of the extension member 711 is attached to the pivot base 813 by means of a pin 901 which extends through both the extension member 711 and the protuberance 805. The broken line circles 902 to 904 indicate the position of the control rods as they group themselves about the foundation rod 709 in a collapsed position.

A partial cross-section of a reactor lattice is shown in Figure 10. A plurality of lattice openings 1, having fissionable material therein, extend through a mass of material 4 which serves as a moderator. The details of the reactor lattice will not be given inasmuch as they are well-known in the reactor art. A control rod group, as was described in regard to the third embodiment of this invention, comprises three movable control rods 2 and one stationary rod 6. The movable control rods 2 are shown in an expanded position within the reactor lattice so that they are close to adjoining lattice openings 1. As shown in the Figure 10, the group can be made to assume a collapsed position so that the movable control rods group themselves about the rod 6. This collapsed position of the movable control rods is indicated by the reference numeral 3. Various arrangements can be made so that the groups may contain any number of control rods above the minimum of two movable rods.

It should be noted that the control means described herein are merely exemplary and not limiting insofar as this invention is concerned since it will be apparent that other similar control means will be suggested to those skilled in the art. Numerous variations and modifications in the preferred embodiments, methods and examples described will be readily apparent and may be made without departing from the spirit and scope of this invention as defined in the following claims.

What is claimed is:

1. In a neutronic reactor having an active portion comprising a mass of thermal neutron fissionable material of sufficient quantity to provide a neutron reproduction ratio at least equal to unity, and means containing neutron absorbing material for controlling the reaction, the improved construction wherein the control means comprises a plurality of elongated members translatably disposed adjacent and parallel to each other, each of said members consisting of a plurality of equal length sections of neutron absorbing materials extending transversely through said members, said sections being separated by equal length sections of neutron permeable materials extending transversely through each of said members, and means for longitudinally positioning said members relative to each other.

2. In a neutronic reactor having an active portion comprising thermal neutron fissionable material in sufficient amount to provide a neutron reproduction ratio at least equal to unity and means for controlling the neutronic reaction including neutron absorbing material, the improvement wherein the control means comprises three parallel elongated members, the first two of said members being translatably disposed relative to the third member, each of said members consisting of a plurality of equal length sections of neutron absorbing materials extending transversely through said members, said sections being separated by equal length sections of neutron permeable material extending transversely through each of said members, and means for longitudinally translating the first two of said members in opposite directions relative to the third member.

3. A neutronic reactor comprising the elements of claim 1 wherein the sections of neutron absorbing materials of the members include lithium.

4. A neutronic reactor comprising the elements of claim 1 wherein the sections of neutron absorbing materials of the members include boron.

5. A neutronic reactor comprising the elements of claim 1 wherein the sections of neutron absorbing materials of the members include thorium.

6. In a neutronic reactor having an active zone comprising a thermal neutron fissionable material in a sufficient amount to provide a neutron reproduction ratio of at least equal to unity, and a control means characterized by the improved construction wherein the control means comprises a plurality of elongated members translatably disposed adjacent and parallel to each other, each of said members consisting of a plurality of equal length sections of neutron absorbing materials extending transversely through said members, said sections being separated by equal length sections of neutron permeable materials extending transversely through each of said members, and means for longitudinally positioning said members relative to each other comprising a threaded rod centrally disposed among the members of the group, connector pins individually associated with some of said members and operatively engaged with the rod and their associated members, a motor coupled to the rod and adapted to rotate the rod to transmit linear motion to some of the members through said associated connector pins, thereby effecting control over the reactivity in the reactor without removing, withdrawing, or extending said control members outside the active zone.

7. A neutronic reactor comprising the elements of claim 6 wherein the threaded rod has various sections thereof possessing different screw threads, each of said sections associated with a particular connector pin and engaged therewith, whereby during the rotation of said rod each of said connector pins transmits linear motion to each of its associated members at a rate depending on the screw thread thereby imparting different linear motions to the different members comprising the integral group.

References Cited in the file of this patent

UNITED STATES PATENTS

| 2,708,656 | Fermi et al. | May 17, 1955 |
| 2,852,458 | Dietrich et al. | Sept. 16, 1958 |
| 2,856,336 | Metcalf | Oct. 14, 1958 |

OTHER REFERENCES

U.S. Atomic Energy Commission, TID-7001, Materials Testing Reactor Handbook Project, edited by John H. Buck, Carl F. Leyse, May 7, 1951, p. 53-61.

Nucleonics, vol. 11 (June 1953), pp. 39-40.